No. 869,247. PATENTED OCT. 29, 1907.
H. B. KEIPER.
COMBINED MOTOR AND HAND OPERATED ROTARY BLOWER.
APPLICATION FILED FEB. 1, 1907.
4 SHEETS—SHEET 1.
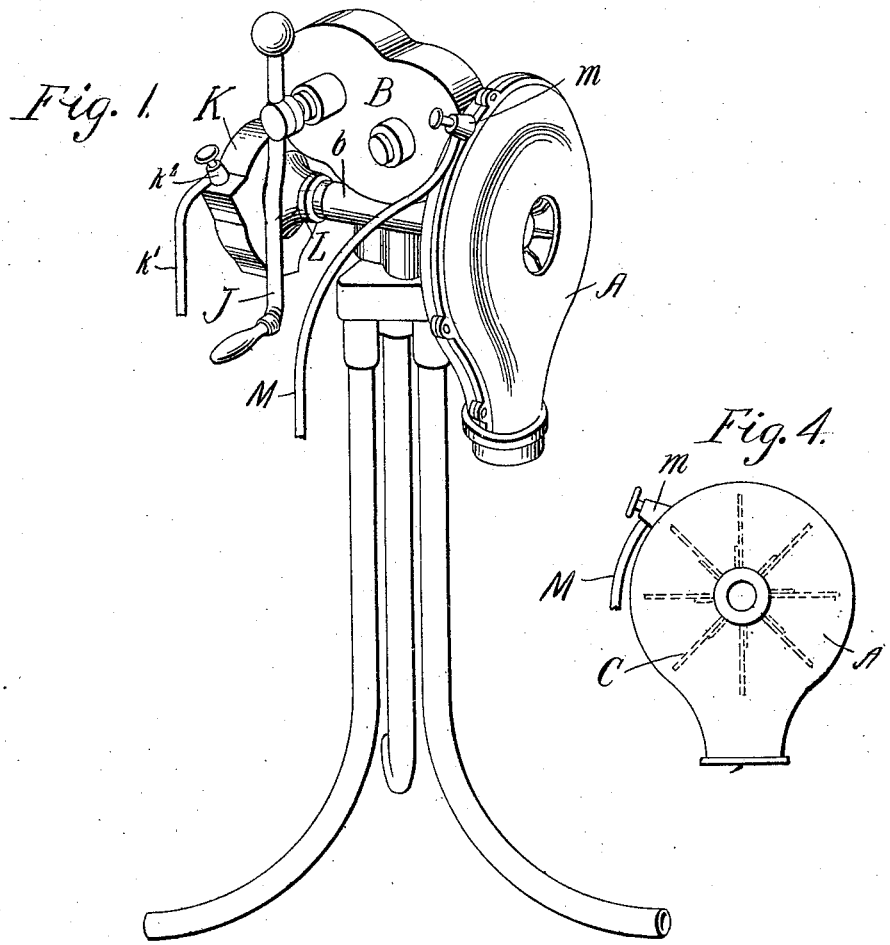
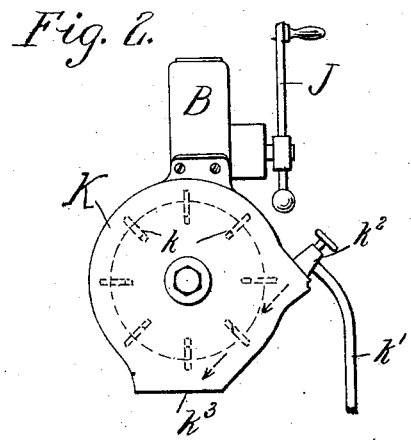
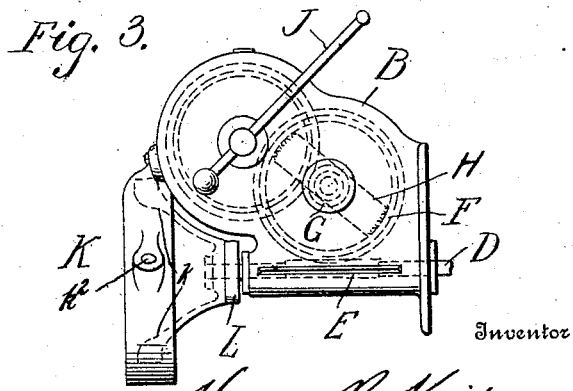

No. 869,247. PATENTED OCT. 29, 1907.
H. B. KEIPER.
COMBINED MOTOR AND HAND OPERATED ROTARY BLOWER.
APPLICATION FILED FEB. 1, 1907.
4 SHEETS—SHEET 2.
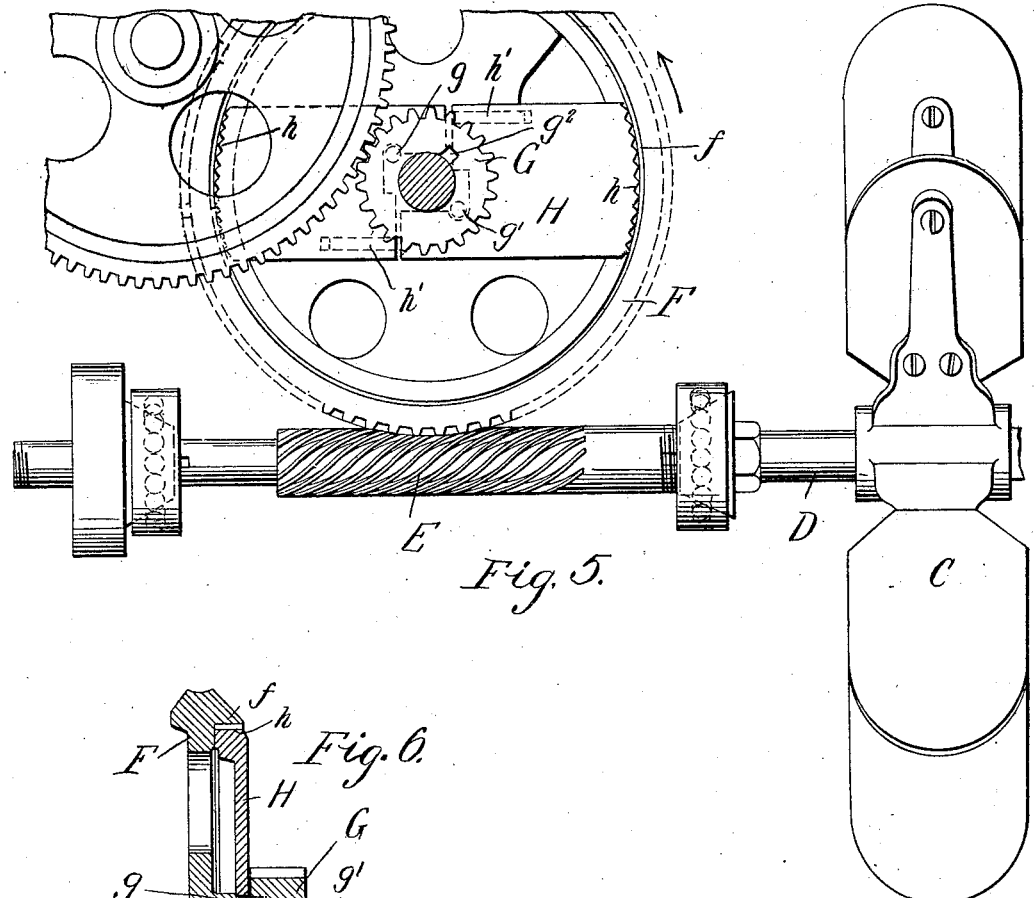
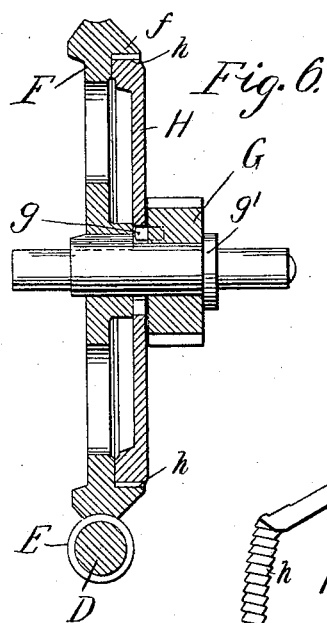
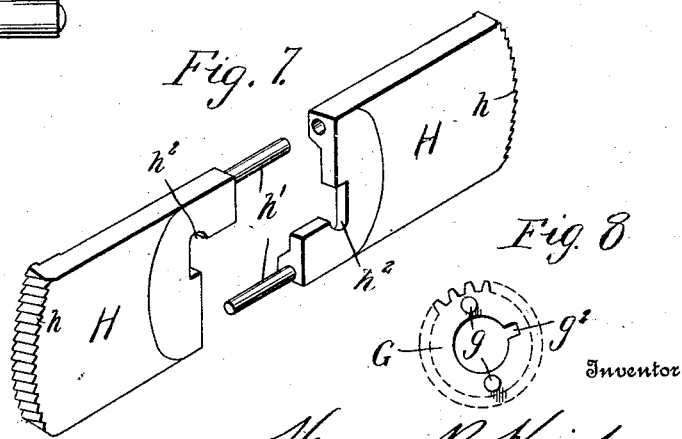
Witnesses
Jos. F. Collins
Edward R. Whitman
Inventor
Henry B. Keiper
By Julian C. Dowell
his Attorneys No. 869,247. PATENTED OCT. 29, 1907.
H. B. KEIPER.
COMBINED MOTOR AND HAND OPERATED ROTARY BLOWER.
APPLICATION FILED FEB. 1, 1907.
4 SHEETS—SHEET 3.
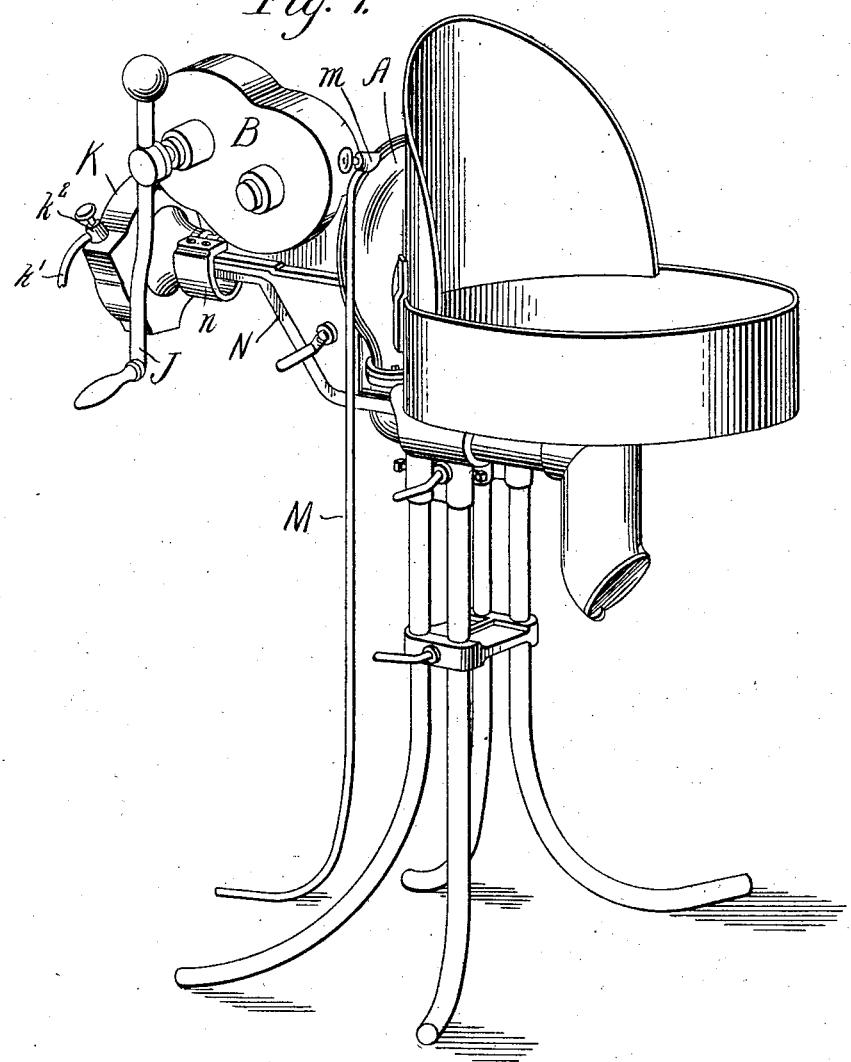
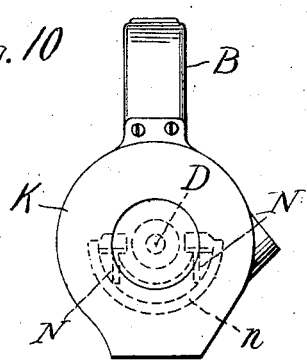

No. 869,247. PATENTED OCT. 29, 1907.
H. B. KEIPER.
COMBINED MOTOR AND HAND OPERATED ROTARY BLOWER.
APPLICATION FILED FEB. 1, 1907.
4 SHEETS—SHEET 4.
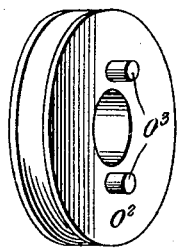
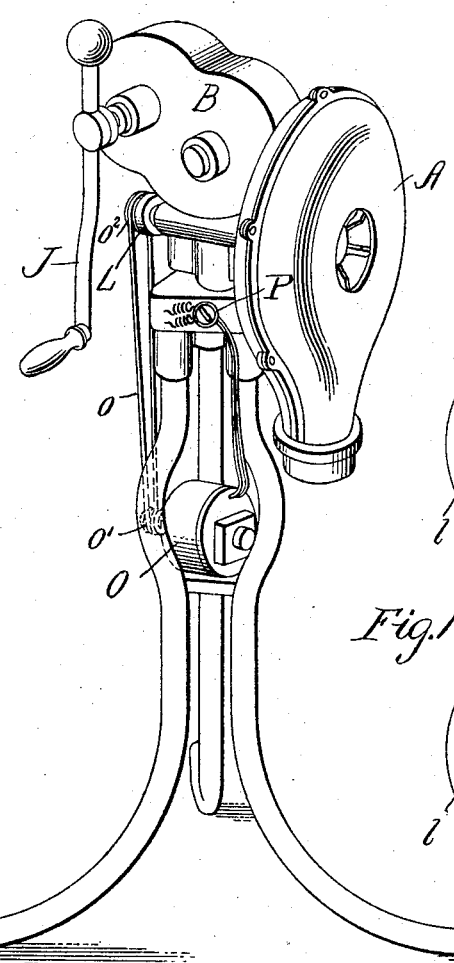
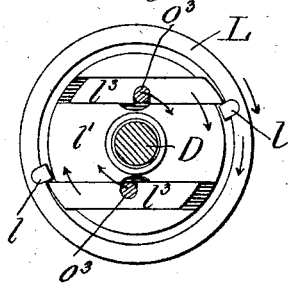
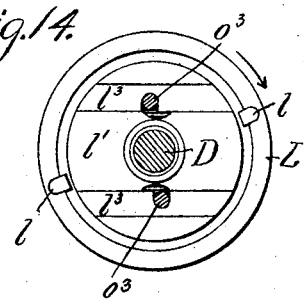
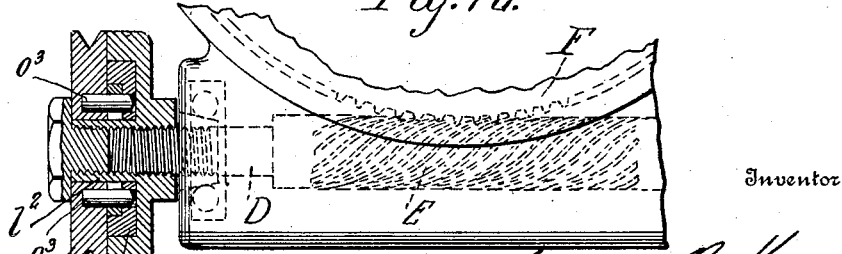
Witnesses
Jos. H. Collins
Edward R. Whitman
Inventor
Henry B. Keiper
By Julian C. Dowell & Son,
his Attorneys.
THE NORRIS PETERS CO., WASHINGTON, D. C.

UNITED STATES PATENT OFFICE.

HENRY B. KEIPER, OF LANCASTER, PENNSYLVANIA, ASSIGNOR TO THE CHAMPION BLOWER & FORGE COMPANY, OF LANCASTER, PENNSYLVANIA, A CORPORATION OF PENNSYLVANIA.

COMBINED MOTOR AND HAND OPERATED ROTARY BLOWER.

No. 869,247.            Specification of Letters Patent.            Patented Oct. 29, 1907.

Application filed February 1, 1907. Serial No. 355,289.

*To all whom it may concern:*

Be it known that I, HENRY B. KEIPER, a citizen of the United States, residing at Lancaster, in the county of Lancaster and State of Pennsylvania, have invented certain new and useful Improvements in a Combined Motor and Hand Operated Rotary Blower; and I do hereby declare the following to be a full, clear, and exact description of the invention, such as will enable others skilled in the art to which it appertains to make and use the same.

This invention relates to blowers and forges, and the main object is to provide a practicable combined motor-driven and hand-operated mechanism for imparting motion to the fan or blower of a forge or similar apparatus, each operating-instrumentality acting independently of and without affecting the action of the other. By this means, the power on hand (as compressed air, steam or electricity), in a shop or factory, may be conveniently utilized for driving the blower, thus dispensing with the services of a man to operate the crank-handle or lever, which will remain stationary during the running of the blower by power; while, in the absence of power, or in the event of stopping the motor, the operator can at once grasp the handle and run the machine by hand, without waiting to change connections, and without affecting the action of the motor-driven mechanism.

The invention will hereinafter be fully described with reference to the accompanying drawings, which form a part of this specification, and then more particularly pointed out in the claims at the end of the description. I do not, however, desire to be understood as limiting my invention to the specific constructions or devices shown and described, as it will be obvious that other and equivalent means may be devised for the same purpose and with like results.

In said drawings: Figure 1 is a perspective view of one practicable type of blower embodying my invention, having means for operating the same either by hand or by the agency of compressed air or other motive fluid, two modes of operating by compressed air being represented, namely an air-motor at the rear of the blower-shaft, and means for direct application of air on the blower-fan. Fig. 2 is a rear elevation of the gear-casing of the blower, together with the aforesaid air-motor at the rear of the blower-shaft. Fig. 3 is a side elevation of the subject-matter of Fig. 2. Fig. 4 is a rear view of the blower proper, that is the rotary fan and its casing, the fan being indicated by dotted lines, and showing the aforesaid means for a direct application of compressed air on the blower-fan. Fig. 5 is a side view of a portion of the train of gears for driving the blower from the crank-handle or lever. Fig. 6 is a vertical cross-section on line 6—6 of Fig. 5. Fig. 7 is a perspective view of a clutch employed in said train of gears. Fig. 8 is a face view of a pinion, which is one of the said train of gears. Fig. 9 is a perspective view of a portable forge combined with a similar blower embodying my invention. Fig. 10 is a rear view of the gear-casing and casing of the air-motor of the blower illustrated in Fig. 9, showing by dotted lines the supports for the gear-casing and a U-shaped connection between the rear ends of said supports. Fig. 11 is a perspective view of a rotary blower similar to the others, shown mounted upon a modified form of tripod or stand supporting an electric motor for driving the blower in lieu of compressed air. Fig. 12 is a detail view of a portion of the driving mechanism shown in Fig. 11, showing in cross-section a pulley on the fan-shaft to which power from the motor is applied, and also a clutch by which the pulley is operatively-connected with the fan-shaft when the motor is in operation, while allowing the fan-shaft to revolve without affecting the said pulley or the said motor when the blower is driven by hand. Fig. 13 is a detail view of one of the clutch-members, showing the parts thereof in position for imparting motion to the blower-shaft through the action of the electric motor. Fig. 14 is a similar view of the same clutch-member showing the parts in the position assumed when the motor is idle and the blower is being operated by hand. Fig. 15 is a perspective view of the aforesaid pulley, the latter being a coöperative part of the aforesaid clutch.

The drawings represent a well-known rotary blower of improved type, which is the subject of several Letters Patent of the United States heretofore granted me, and no specific description thereof is deemed necessary.

The letter A denotes the casing of the fan blower, attached to or arranged at the front of a gear-casing B.

A partial interior view of the gearing is illustrated in Fig. 5. As shown, the rotary fan C of the blower is mounted on a driving-shaft D having a spiral gear or worm E thereon which is engaged by a worm-wheel F, the latter being one of a train of gears for driving the blower by hand from the crank-handle or lever J shown in Fig. 1. A suitable clutch is incorporated in the driving-mechanism, preferably between the worm-wheel F and the adjacent pinion or cog-wheel G of the train of gears, in order that the crank-handle or lever J when turned in one direction may impart motion to the blower, but remain idle when the blower is operated by power or by a motor, as hereinafter explained. In this connection, I have devised the improved clutch now to be described.

Between the gears F and G is arranged a separable clutch-plate H, having opposite curved or segmental ends *h* which are toothed to engage within the rim or flange *f* of the worm-wheel. Said clutch-plate H comprises two parts, at opposite sides of the axle of the gears, and they are held in proper relation by pins $h'$, one pin on each part slidably fitted in a hole therefor in the other. The pinion G carries a pair of lateral pins or lugs $g$, which engage respectively in seats or notches $h^2$ in the two parts of the clutch H. The arrangement is such that when the pinion G is turned in a direction to drive the blower, the pins or lugs $g$ ride outwardly in their seats or notches $h^2$ and forcibly spread the two parts of the clutch apart, whereby the worm is clutched and the blower is positively driven. But when the worm-wheel is independently revolved, it will simply turn freely around the clutch, whose two parts engaged by the pins $g$ of the pinion are allowed to move together and release the clutch. It is understood, of course, that at least one of the gears F or G is loose on its axle. Preferably the worm-wheel F is keyed to or fast on its axle or shaft, the latter being mounted in ball-bearings, and the pinion G is loose thereon and held in place by a shoulder $g'$ on said shaft; the pinion being shown provided with a keyway $g^2$ to allow it to slip over the key for the worm-wheel when assembling the parts.

By the foregoing device, it is obvious that the crank-handle or lever will impart motion to the blower when operated in one direction only, but will remain idle and out of the way when the blower is driven by power from other sources. At the same time, the operation of the blower from a motor or other power than hand will not impart motion to the train of gears, all of which except the worm-wheel F will remain idle in such case, thus avoiding waste of power.

For operating the blower by power, or independently of the crank-handle or lever J, I have represented in the drawings several different mechanisms. In Figs. 1, 2 and 3 I have shown an air-motor K arranged at the rear end of the fan-shaft D and adapted to be operatively-connected therewith by an interposed clutch L, so that the motor will impart motion to the blower when operated in one direction only, but will remain idle without being affected by the rotation of the fan-shaft when the blower is driven by the crank-handle. The air-motor K may comprise a casing, suitably attached to the gear-casing B or otherwise supported, and inclosing therein a rotary fan $k$, said fan $k$ being attached to one member of the clutch L, whose other member is attached to the blower-shaft D. Compressed air or other motive fluid, taken from a suitable source of supply through a tube $k'$, enters the motor casing at $k^2$, through a suitable valve-controlled opening, and impinges on the blades of the fan $k$ as represented by dotted lines in Fig. 2, the spent air passing out through an exit-opening $k^3$.

I have also represented in Figs. 1 and 4 means for applying a jet of compressed air or steam directly to the blower C, in lieu of using an independent air-motor; such means comprising a suitable tube M for supplying the compressed air or motive fluid and communicating with the blower-casing A through a valve-controlled inlet $m$, so that a jet of compressed air or steam may impinge directly upon the blades of the blower-fan C and impart rotary motion thereto, as indicated by dotted lines in Fig. 4. After acting upon the blades of the fan C, the air or steam introduced through said tube M becomes mixed or diffused with the air which is drawn into the blower through the opening or openings in the casing A around the fan-shaft and passes out therewith through the nozzle of the blower, or through the twyer of the hearth-plate and into the fire; so that the compressed air applied to the blower in this manner not only revolves the fan, but also increases the supply of air which is delivered by the blower.

The foregoing explains two convenient modes of utilizing compressed air or other motive fluid, when it is in use in a shop or factory, for driving the blower; it being observed that the blower can be driven either by direct application of the motive fluid on the blades of the fan, or by means of the air-motor at the rear end of the fan-shaft; or both instrumentalities may be utilized simultaneously if desired for increasing the power and speed; and during such operation of the blower the crank-handle or lever remains idle, as aforesaid, so that it is out of the way and does not interfere with or obstruct the workmen or operatives at the forge.

In Figs. 9 and 10, substantially the same mechanism, including the air-motor K and the tube M for direct application of compressed air to the blower, is shown applied to the blower of a portable forge, of the character set forth in my prior U. S. Patent No. 676,323, dated June 11, 1901. In this case, the angle-beams N which support the gear-casing B are joined at their rear ends by a U-shaped connection $n$ passing under that portion $b$ of the gear-casing B which contains the fan-shaft D, as shown in said Fig. 5 and represented by dotted lines in Fig. 6.

In Fig. 11 of the drawings I have represented an electric motor O, located between bowed portions of the tripod or stand on which the blower and its driving mechanism are mounted, and shown in electrical connection with a switch P adapted to be connected with any suitable source of supply for energizing the motor. In this case motion is communicated to the fan-blower by means of a cord $o$ passing over grooved pulleys $o'$ and $o^2$ on the shaft of the motor and the fan-shaft respectively, said pulley $o^2$ constituting one member of the clutch L interposed between the driving-connections and the fan-shaft.

A preferred form of clutch, that may be used for locking the fan-shaft D to the pulley $o^2$ thereon through which motion is imparted to the blower from the motor (and which may also be used for locking the fan-shaft to the hub of the fan $k$ of the air-motor K, or to any other power-driven element), is shown in detail in Figs. 12 to 15 inclusive. The said clutch comprises an annular body L, having projections $l$ extending inwardly from its inner periphery and having a hub-portion secured fast upon the fan-shaft D, and inclosing a disk $l'$ which fits loosely within said cylindrical body, around or upon a sleeve $l^2$ projecting from the hub-portion thereof. The said disk $l'$ has transverse grooves or recesses therein in which are fitted slides $l^3$, $l^3$, whose ends will be made to project and engage the projections $l$ so as to cause the disk $l'$ to rotate with the annular body when the parts are turned in one direction, but will recede and permit movement in the opposite direction without imparting motion thereto. The coacting member of said clutch by which the slides $l^3$, $l^3$, are actuated and controlled may consist of the pulley $o^2$ loosely fitted on the sleeve or tube $l^2$ projecting from said annular body, or first named member of the clutch (or said coacting member may be the hub of the fan $k$ of the air-motor K in Figs. 1 and 3). Said coacting clutch-member is provided with projections or pins $o^3$, $o^3$, adapted to enter recesses or notches in said sliding catches $l^3$, $l^3$ and act thereon in such manner as to hold said sliding catches with their free ends flush with the periphery of the disk $l'$ when moving in one direction, and to cause the same to move outwardly so as to engage the projections $l$ when the pulley $o^2$ is rotated in the opposite direction.

I thus provide a simple and efficient means whereby the fan-blower may be operated by hand or by a motor or power, each acting independently of the other and each in its turn being adapted to remain idle or inactive while the other driving force is active, so that the blacksmith or attendant of the forge may have at hand other means for imparting motion to the blower when it is inconvenient or undesirable to drive the same by hand, and at the same time the blower may be driven by hand in the usual way, without any change whatever in the driving-mechanism, when it is not convenient or desirable to use the motor. It will be understood that the invention is applicable to blowers and forges of other types in general.

Having thus described my invention what I claim as new and desire to secure by Letters Patent of the United States, is:—

1. The combination, in a rotary blower, of a fan driving shaft, a hand-operated device and coöperating mechanism for imparting motion to said blower when said hand-operated device is moved in one direction only, together with a motor combined with said mechanism for imparting motion to said blower independently of said hand-operated device but in the same direction only, neither affecting the operation of the other, and each adapted to remain idle when the other is operating.

2. In combination, a rotary blower, a driving shaft therefor, a clutch on said driving shaft having a fast and a loose member, and means for locking the same so as to cause the shaft to turn therewith when turned in one direction only, a motor for imparting motion to said loose member and through it to the fan driving shaft when said members are locked, a hand-operated device and intermediate mechanism for imparting motion to said fan driving shaft independently of said motor, and a second clutch device whereby said hand device is adapted to remain idle when the blower is being driven by said motor, the latter being adapted to remain idle when the blower is actuated by said hand device, substantially as described.

3. In combination with a blower, a fan driving shaft, a hand-operated device for imparting motion to said fan driving shaft in one direction only, a motor for imparting motion to said fan driving shaft in the same direction only as that in which it is driven by said hand-operated device, and mechanism whereby when the fan-blower is being actuated by the motor the hand-operated device may remain idle, and vice versa.

4. The combination, in a rotary blower, of a fan-driving shaft having a spiral or worm thereon, a hand-operated device and an intermediate train of gears including a worm-wheel engaging said spiral and including a clutch adapted to engage said worm-wheel only when the hand-operated device is worked in one direction, but adapted to release said worm-wheel from the remaining gears when the fan-shaft is driven independently, and a motor for independently running said shaft.

5. The combination, with a rotary fan-blower, of the fan-shaft, a hand-operated device, and intermediate driving-mechanism for impelling said fan-shaft by hand, said mechanism including a clutch whereby the fan-shaft can be driven in one direction only by said hand-operated device, and in the same direction independently of said hand-operated device without affecting or causing motion of the same, and means for operating said blower by compressed air or motive fluid.

6. The combination, with a rotary fan-blower, of the fan-shaft, a hand-operated device, and intermediate driving-mechanism for impelling said fan-shaft by hand, said mechanism including a clutch whereby the fan-shaft can be driven in one direction only by said hand-operated device, and in the same direction independently of said hand-operated device without affecting or causing motion of the same, and an air-motor on said fan-shaft for driving the same independently of said hand-operated device, said motor comprising an air-impelled fan operatively connected with said shaft by a clutch permitting said shaft to be driven in one direction only by said hand-operated device and without motion of said air-motor.

7. In a rotary blower, a fan-driving shaft and independently operating hand and power devices for imparting motion thereto, comprising means for driving said shaft by hand, and a motor operatively connected therewith for driving said shaft by power, together with intermediate clutch devices for throwing either or both of said hand and power devices into gear independently or simultaneously when driven in one direction only, whereby said fan may be driven either by hand or by power or by both together through the same driving mechanism, said hand and power devices being adapted to operate independently without either affecting or interfering with the operation of the other, whether in operation or at rest.

8. In a rotary blower, a fan-driving shaft and hand and power driven mechanisms each adapted to operate independently of the other for imparting motion to said shaft, comprising a hand-operated device and a motor combined with connected driving gearing through which motion may be imparted to said fan-shaft by either said device or said motor, each being adapted to remain idle while the other is in operation, and means for engaging said device and said motor with said driving gearing to adapt either to operate in driving the fan while the other is in operation.

9. In a rotary blower, a fan-driving shaft and hand and power driven mechanisms adapted to operate either conjointly or independently for imparting motion to said shaft, comprising in combination with suitable driving gearing a device for driving the shaft by hand and a motor for driving the shaft by power, said device and motor each being operatively connected with driving mechanism common to both through which motion is imparted to said shaft and each adapted to remain idle when the other is in operation, together with means whereby either said device or said motor may be operated for driving said shaft independently of and without interfering with the operation of the other.

In testimony whereof I affix my signature, in presence of two witnesses.

HENRY B. KEIPER.

Witnesses:
  CHAS. E. LONG,
  LEON K. PAXSON.